(12) United States Patent
Wu et al.

(10) Patent No.: US 9,123,383 B1
(45) Date of Patent: Sep. 1, 2015

(54) ZERO PHASE START ESTIMATION IN READBACK SIGNALS

(71) Applicant: LSI Corporation, San Jose, CA (US)

(72) Inventors: Xuebin Wu, San Jose, CA (US); Shaohua Yang, San Jose, CA (US); Zhi Bin Li, Shanghai (CN); Haitao Xia, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 29 days.

(21) Appl. No.: 14/197,748

(22) Filed: Mar. 5, 2014

Related U.S. Application Data

(60) Provisional application No. 61/939,530, filed on Feb. 13, 2014.

(51) Int. Cl.
*G11B 20/20* (2006.01)
*G11B 20/10* (2006.01)
*G11B 5/09* (2006.01)

(52) U.S. Cl.
CPC .................. *G11B 20/1024* (2013.01)

(58) Field of Classification Search
CPC .... G11B 20/20; G11B 20/16; G11B 5/59688; G11B 20/10009; G11B 5/09; G11B 20/1426; G11B 5/00; G11B 5/012
USPC ......... 360/26, 24, 29, 31, 39, 42, 55
See application file for complete search history.

(56) References Cited

U.S. PATENT DOCUMENTS

| | | | |
|---|---|---|---|
| 6,738,205 B1 | 5/2004 | Moran et al. | |
| 7,859,778 B1 * | 12/2010 | Vikramaditya et al. | ........ 360/26 |
| 8,325,433 B2 | 12/2012 | Zhang et al. | |
| 8,570,677 B2 | 10/2013 | Braganca et al. | |

* cited by examiner

*Primary Examiner* — Nabil Hindi
(74) *Attorney, Agent, or Firm* — Suiter Swantz pc llo

(57) ABSTRACT

A data storage system identifies analog-to-digital conversion samples with amplitude below a certain threshold. Remaining samples are grouped according to phase into one or more quadrants. A multi-coordinate with overlapping quadrants is used to further differentiate sample points. The system then computes an average phase for zero phase start estimation.

20 Claims, 6 Drawing Sheets

ZERO PHASE START ESTIMATION IN READBACK SIGNALS

PRIORITY

The present application claims the benefit under 35 U.S.C. §119(e) of U.S. Provisional Application Ser. No. 61/939,530, filed Feb. 13, 2014, which is incorporated herein by reference.

BACKGROUND OF THE INVENTION

Data storage systems utilize readback signals to calibrate a read head before reading. Zero phase start is used to provide an initial timing error estimate in frontend digital phase-locked-loop (DPLL) timing loop. When the readback signal includes defects, phase estimation is less reliable. Defects are currently handled by lengthening the sample window or shifting the sample window. Lengthening or shifting the sample window introduces undesirable latency.

Consequently, it would be advantageous if an apparatus existed that is suitable for producing a reliable zero phase start estimation from initial readback signal samples, regardless of defects.

SUMMARY OF THE INVENTION

Accordingly, the present invention is directed to a novel method and apparatus for producing a reliable zero phase start estimation from initial readback signal samples, regardless of defects.

In one embodiment of the present invention, a data storage system identifies analog-to-digital conversion samples with amplitude below a certain threshold. Remaining samples are grouped according to phase into one or more quadrants. The system then computes an average phase for zero phase start estimation.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
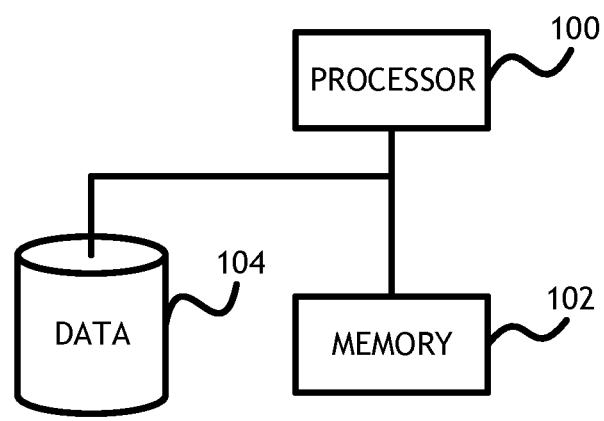
FIG. 1 shows a block diagram of a data storage system according to at least one embodiment of the present invention.

Referring to FIG. 1, a block diagram of a data storage system according to at least one embodiment of the present invention is shown. In at least one embodiment, a computer apparatus, such as a data storage system, a processor 100 is connected to a memory 102 and a data storage element 104. Computer executable program code configured to execute on the processor 100 receives a readback signal when beginning a data read operation from the data storage element 104.

In at least one embodiment, the processor 100 computes a sin term and a cos term for each 4T in the readback signal. The sin term is computed according to the equation:

$$\sin \text{Term } n = x[4n] - x[4n+2]$$

the cos term is computed according to the equation:

$$\cos \text{Term } n = x[4n+1] - x[4n+4]$$

The processor 100 accumulates sin terms and cos terms for 16T or 32T. When the son terms and cos terms are accumulated, the processor 100 computes the input analog-to-digital conversion phase based on the accumulated terms.

Where the readback signal includes defects, the processor 100 determines a phase estimation by eliminating samples with sin terms and cos terms below a certain energy threshold. In at least one embodiment of the present invention, the processor 100 filters samples where the sin term squared plus the cos term squared is below a desired threshold. Furthermore, the processor 100 weighs samples based on accumulated sample phase location in a coordinate system; defective samples tend toward a random phase distribution.

Figure 2:
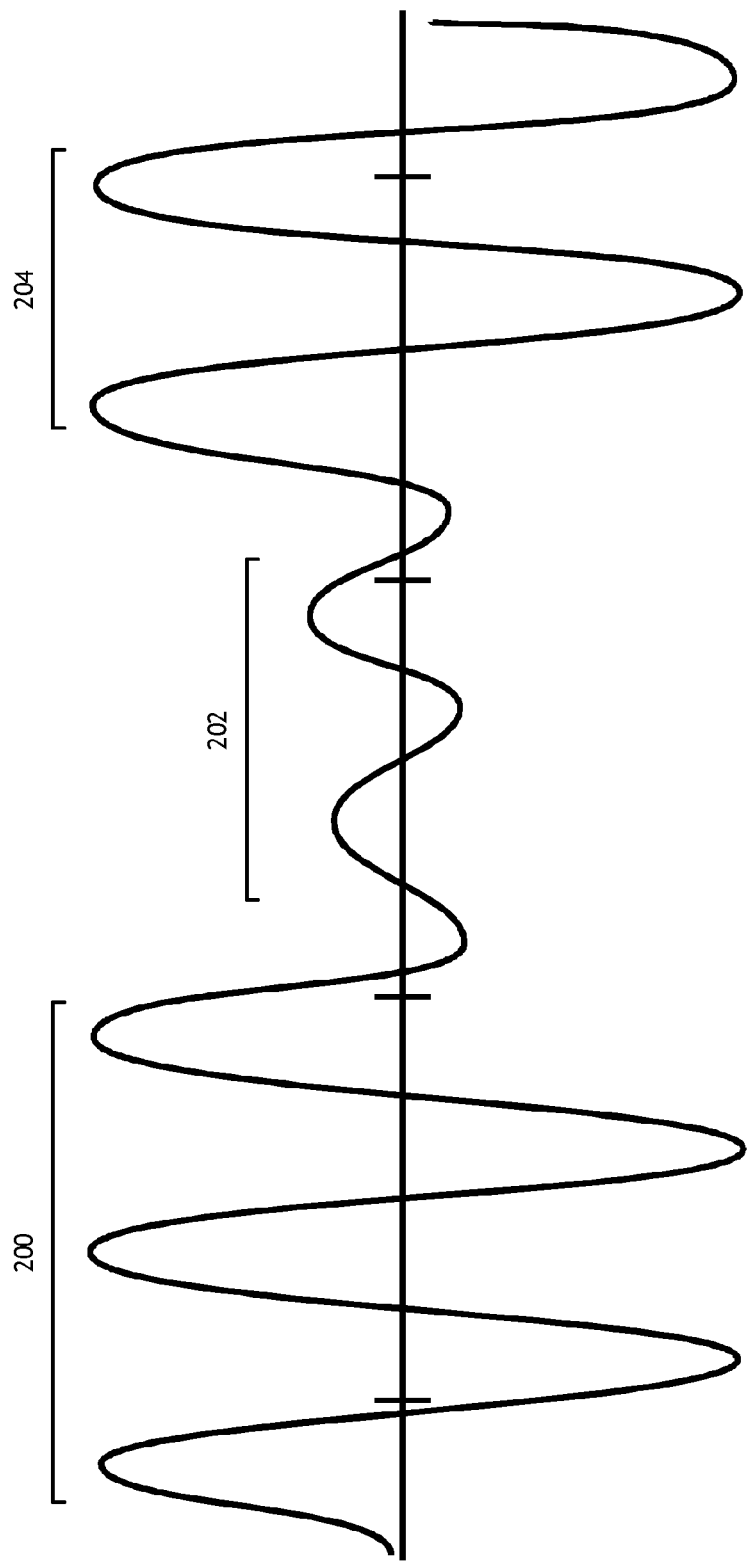
FIG. 2 shows a representation of a readback signal with defects.

Referring to FIG. 2, a representation of a readback signal with defects is shown. The readback signal may include one or more valid, substantially noise free portions 200, 204 and one or more defective portions 202. Defective portions 202 introduce noise to zero phase start calculations. Noise caused by a defective portion 202 can be mitigated by extending the sampling window to include more valid portions 200, 204, or by sliding the sampling window until only valid portions 200, 204 are included. Both solutions add latency to the processes. If defective portions 202 are not excluded, variance of the phase estimation increases and becomes unreliable, increasing the probability of a loss-of-lock during data read.

Figure 3:
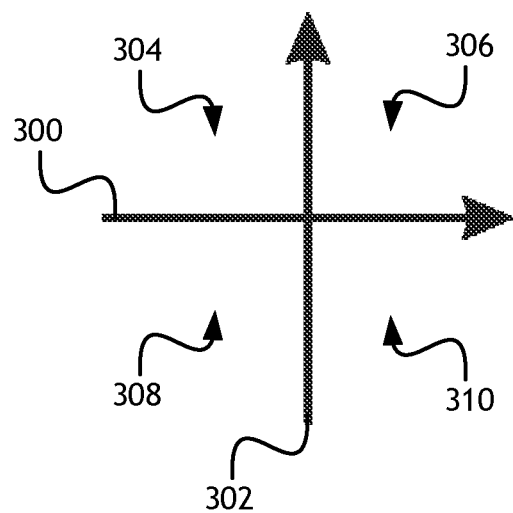
FIG. 3 shows a representation of a coordinate system for mapping components of readback signal samples.

Referring to FIG. 3, a representation of a coordinate system for mapping components of readback signal samples is shown. Each sample falls into a defined coordinate system region 304, 306, 308, 310 based on the sample's sin term 300 and cos term 302. A first region 304 includes samples having a positive sin term 300 and a negative cos term 302. A second region 306 includes samples having a positive sin term 300 and a positive cos term 302. A third region 308 includes samples having a negative sin term 300 and a negative cos term 302. And a fourth region 310 includes samples having a negative sin term 300 and a positive cos term 302. As sin terms 300 and cos terms 302 are computed, the samples are assigned an appropriate region 304, 306, 308, 310 (or quadrant in the present example). Valid samples tend to congregate in the same region 304, 306, 308, 310; defective samples tend to distribute randomly.

Figure 4:
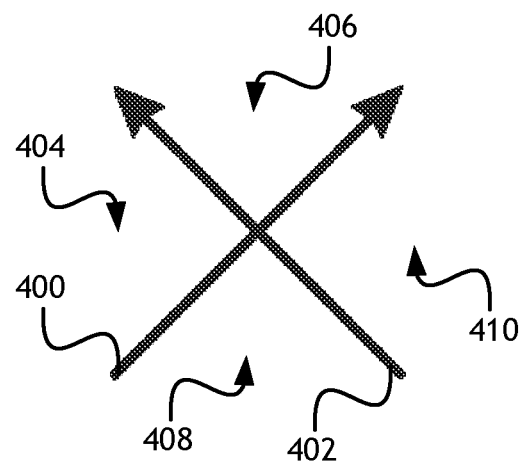
FIG. 4 shows a representation of an alternative coordinate system for mapping components of readback signal samples.

Referring to FIG. 4, a representation of an alternative coordinate system for mapping components of readback signal samples is shown. Where input phases are near a boundary in the coordinate system shown in FIG. 3, samples may not be properly associated. To account for such possibility, the alternative coordinate system defines a first region 404 including samples having a positive sin term 400 and a negative cos term 402, offset by a predetermined amount such as 45°, a second region 406 including samples having a positive sin term 400 and a positive cos term 402, a third region 408 including samples having a negative sin term 400 and a negative cos term 402 and a fourth region 410 including samples having a negative sin term 400 and a positive cos term 402. By including a second coordinate system offset from the coordinate system shown in FIG. 3, samples that would fall into an ambiguous boundary area in one coordinate system fall squarely into a well-defined region of the other coordinate system.

Figure 5:
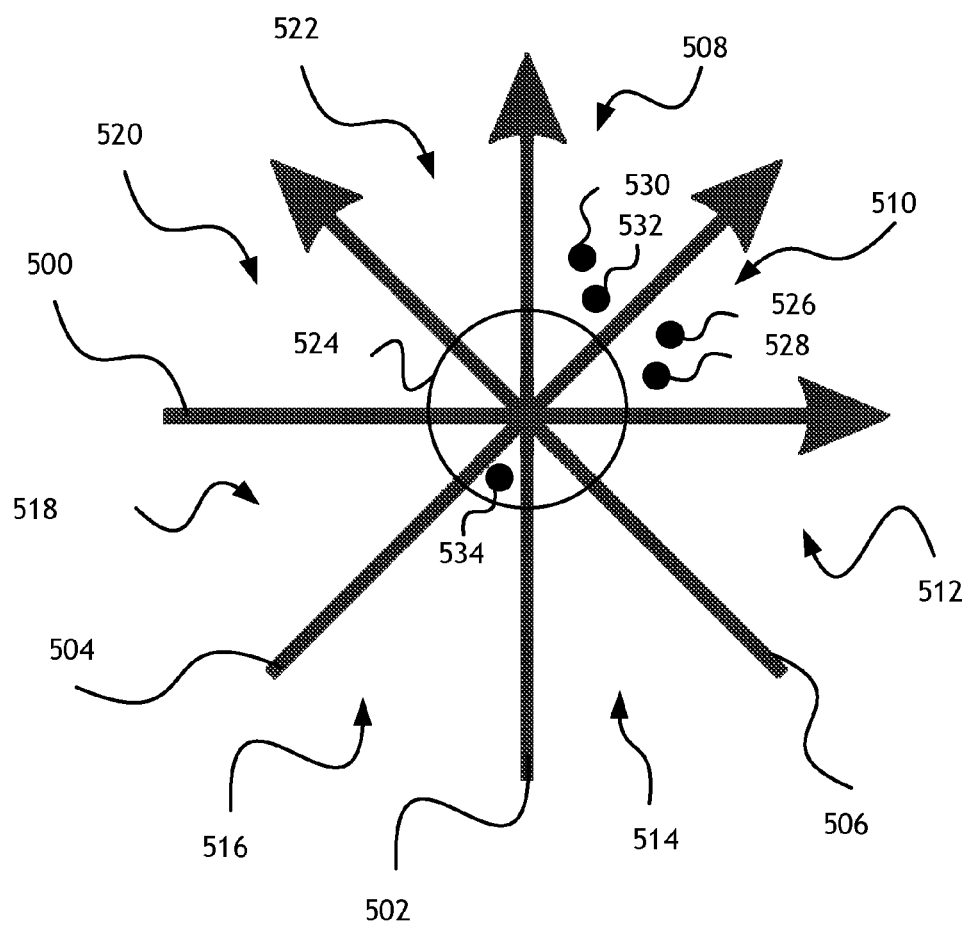
FIG. 5 shows an exemplary representation of a combined coordinate system for mapping components of signal samples.

Referring to FIG. 5, an exemplary representation of a combined coordinate system for mapping components of signal samples is shown. In at least one embodiment, the combined coordinate system includes a first sin term axis 502 and a second sin term axis 506 offset by a certain number of degrees such as 45°. The exemplary combined coordinate system also includes a first cos term axis 500 and a second cos term axis 504 offset by a certain number of degrees such as 45°. While the exemplary embodiments shown herein specify 45°, a person skilled in the art will appreciate that other offsets are applicable in other embodiments. A person skilled in the art may appreciate that the number of axes is dependent on the number of samples. In one exemplary embodiment using 4T samples in the readback signal, each coordinate system is divided into four regions (quadrants); other embodiments may use 6T or other samples, dictating corresponding numbers of regions.

Where the first sin terms axis 502 and first cos terms axis 500 overlap with the second sin term axis 506 and second cos term axis 504, the combined coordinate system defines eight regions 508, 510, 512, 514, 516, 518, 520, 522. Each region 508, 510, 512, 514, 516, 518, 520, 522 defines an overlap portion of the two underlying coordinate systems. While the regions 508, 510, 512, 514, 516, 518, 520, 522 in FIG. 5 are illustrated individually, in actual implementation, the regions defined by the individual coordinate systems are more useful. For example, the first coordinate system defined by the first sin term axis 502 and first cos term axis 500 includes a first quadrant containing a first region 508 and second region 510; a second quadrant containing a third region 512 and fourth region 514; a third quadrant containing a fifth region 516 and sixth region 518 and a fourth quadrant containing a seventh region 520 and eighth region 522. Likewise, the second coordinate system defined by the second sin term axis 506 and second cos term axis 504 includes a first quadrant containing the first region 508 and eighth region 522; a second quadrant containing the second region 510 and third region 512; a third quadrant containing a fourth region 514 and fifth region 516 and a fourth quadrant containing the sixth region 518 and seventh region 520.

In at least one embodiment of the present invention, each calculated sin term and cos term of each readback signal point falls into one of the regions (in this case quadrants) defined by each coordinate system. Generally, valid readback signal points 526, 528, 530, 532 will fall into one quadrant of either the first coordinate system or the second coordinate system. Defective readback signal points 534 will be distributed randomly. In the present example, all of the valid readback signal points 526, 528, 530, 532 appear in the first quadrant of the first coordinate system. Furthermore, defective readback signal points 534 tend to have lower amplitude than valid readback signal points 526, 528, 530, 532. Therefore, in at least one embodiment of the present invention, a threshold amplitude 524 defines a cut-off below which readback signal points are considered defective. Once one of the quadrants includes a predetermined number of valid readback signal points 526, 528, 530, 532, the final input phase is estimated.

Figure 6:
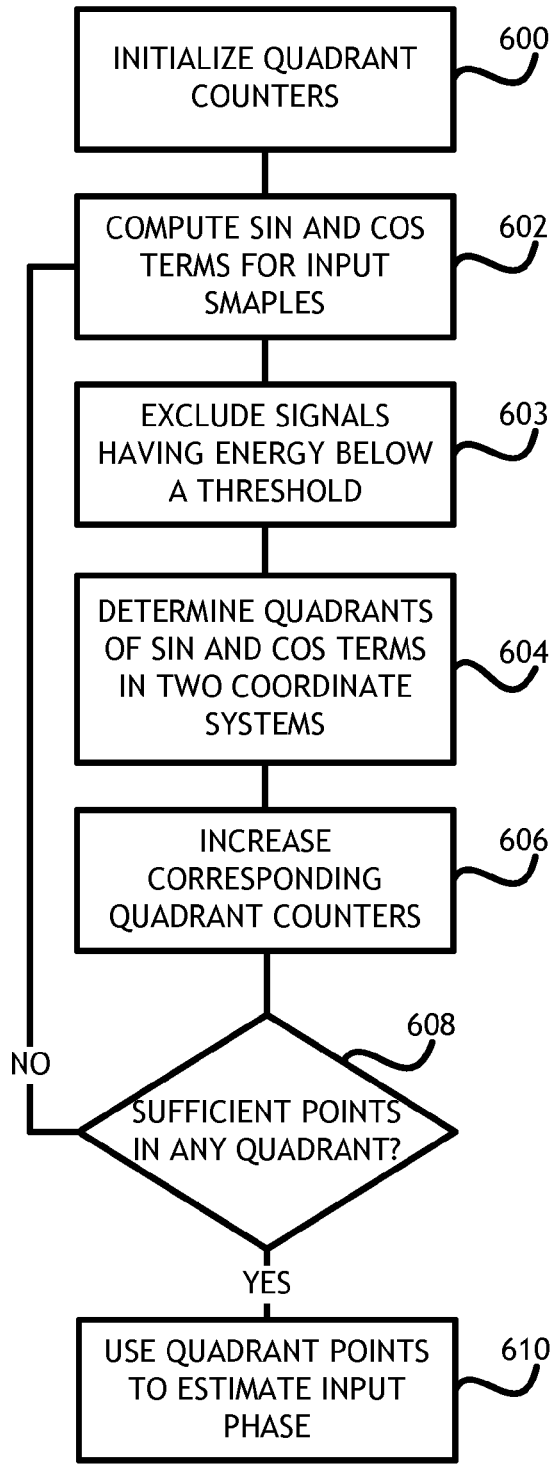
FIG. 6 shows a flowchart for a method of estimating input phase from a readback signal.

Referring to FIG. 6, a flowchart for a method of estimating input phase from a readback signal is shown. Where a computer system is analyzing a readback signal, the system initializes 600 region or quadrant counters. Each region or quadrant counter is associated with a phase defined region in a coordinate system. In at least one embodiment, the computer system defines more than one coordinate system, each coordinate system being offset from the others. The system then computes 602 sin and cos terms for each input sample received from the readback signal. In at least one embodiment, defective signals are assumed to have a smaller energy than valid, non-defective signals; therefore, signals with energy below a certain threshold are excluded 603 from further analysis. The sin and cos terms are placed 604 in regions of the one or more coordinate systems and the corresponding region or quadrant counters are increased. If the computer system determines 608 that it has sufficient sample points in any one quadrant, the system determines 610 an estimated input phase based on the points in that quadrant. Otherwise, the computer system computes 602 additional sin and cos terms of additional samples.

Figure 7:
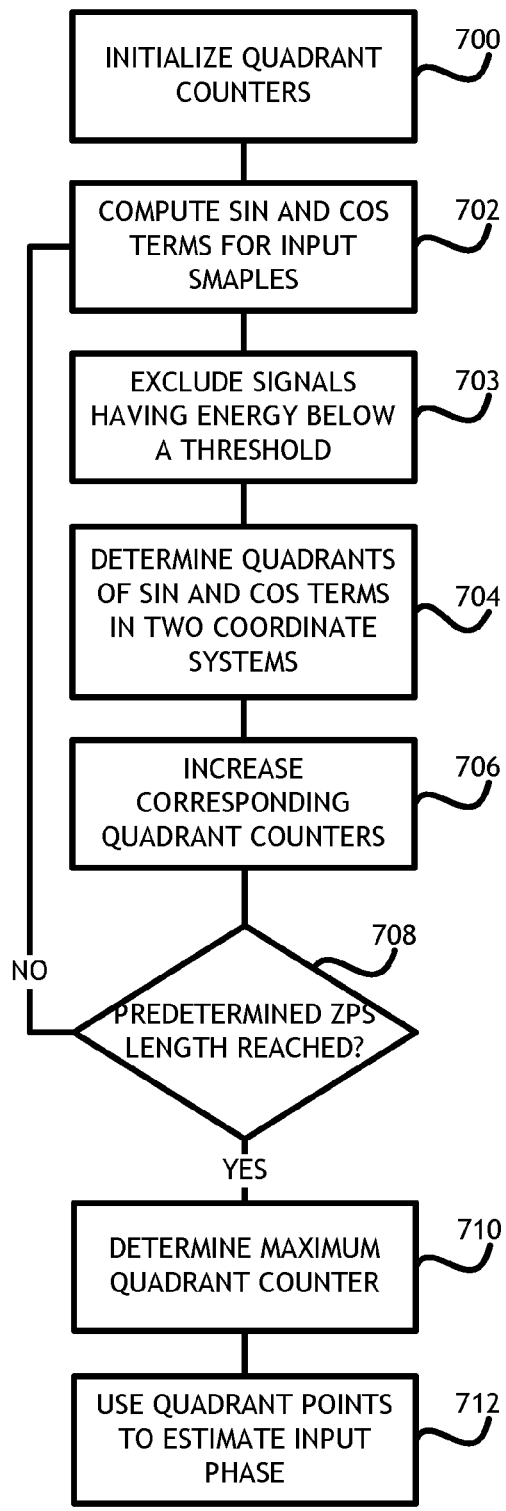
FIG. 7 shows a flowchart for a method of estimating input phase from a readback signal.

Referring to FIG. 7, a flowchart for a method of estimating input phase from a readback signal is shown. Where a computer system is analyzing a readback signal, the system initializes 700 region or quadrant counters. Each region or quadrant counter is associated with a phase defined region in a coordinate system. In at least one embodiment, the computer system defines more than one coordinate system, each coordinate system being offset from the others. The system then computes 702 sin and cos terms for each input sample received from the readback signal. In at least one embodiment, defective signals are assumed to have a smaller energy than valid, non-defective signals; therefore, signals with energy below a certain threshold are excluded 703 from further analysis. The sin and cos terms are placed 704 in regions of the one or more coordinate systems and the corresponding region or quadrant counters are increased. If the computer system determines 708 that the zero phase start sample length has been reached, the system determines 710 which region or quadrant has the maximum number of points based on the region or quadrant counters. The system then determines 712 an estimated input phase based on the points in that quadrant. Otherwise, the computer system computes 702 additional sin and cos terms of additional samples.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer apparatus comprising:
   a processor;
   memory connected to the processor; and
   computer executable program code configured to execute on the processor, wherein the computer executable program code is configured to:
   receive a plurality of readback signal samples;
   determine a sin term for each readback signal sample;

determine a cos term for each readback signal sample;
organize the readback signal samples according to the corresponding sin terms and cos terms; and
compute an input phase based on the organized readback signal samples.

2. The computer apparatus of claim 1, wherein organizing the readback signal samples comprises:
defining a first coordinate system, a first axis of the first coordinate system corresponding to sin function and a second axis of the first coordinate system corresponding to a cos function; and
placing each readback signal sample in the first coordinate system.

3. The computer apparatus of claim 2, wherein the computer executable program code is further configured to:
maintain a region counter corresponding to each of a plurality of regions in the first coordinate system;
increment a corresponding region counter each time a readback signal sample is organized into the corresponding region; and
identify when one of the plurality of regions includes a threshold number of readback signal samples.

4. The computer apparatus of claim 2, wherein organizing the readback signal samples further comprises:
defining a second coordinate system, a first axis of the second coordinate system corresponding to sin function and a second axis of the second coordinate system corresponding to a cos function, the second coordinate system being offset from the first coordinate system by a predetermined angle; and
placing each readback signal sample in the second coordinate system.

5. The computer apparatus of claim 4, wherein the computer executable program code is further configured to:
maintain a region counter corresponding to each of a plurality of regions in the second coordinate system;
increment a corresponding region counter each time a readback signal sample is organized into the corresponding region; and
identify when one of the plurality of regions includes a threshold number of readback signal samples.

6. The computer apparatus of claim 4, wherein each readback signal sample comprises a 4T signal and each of the first coordinate system and second coordinate system comprises four quadrants.

7. The computer apparatus of claim 1, wherein the computer executable program code is further configured to:
define an amplitude threshold; and
exclude any readback signal samples that fall below the amplitude threshold from the computation of input phase.

8. A method for estimating a readback signal phase comprising:
receiving a plurality of readback signal samples;
determining a sin term for each readback signal sample;
determining a cos term for each readback signal sample;
organizing the readback signal samples according to the corresponding sin terms and cos terms; and
computing an input phase based on the organized readback signal samples.

9. The method of claim 8, wherein organizing the readback signal samples comprises:
defining a first coordinate system, a first axis of the first coordinate system corresponding to sin function and a second axis of the first coordinate system corresponding to a cos function; and
placing each readback signal sample in the first coordinate system.

10. The method of claim 9, further comprising:
maintaining a region counter corresponding to each of a plurality of regions in the first coordinate system;
incrementing a corresponding region counter each time a readback signal sample is organized into the corresponding region; and
identifying when one of the plurality of regions includes a threshold number of readback signal samples.

11. The method of claim 9, wherein organizing the readback signal samples further comprises:
defining a second coordinate system, a first axis of the second coordinate system corresponding to sin function and a second axis of the second coordinate system corresponding to a cos function, the second coordinate system being offset from the first coordinate system by a predetermined angle; and
placing each readback signal sample in the second coordinate system.

12. The method of claim 11, further comprising:
maintaining a region counter corresponding to each of a plurality of regions in the second coordinate system;
incrementing a corresponding region counter each time a readback signal sample is organized into the corresponding region; and
identifying when one of the plurality of regions includes a threshold number of readback signal samples.

13. The method of claim 8, further comprising:
defining an amplitude threshold; and
excluding any readback signal samples that fall below the amplitude threshold from the computation of input phase.

14. A data storage system comprising:
a processor;
memory connected to the processor;
a data storage element connected to the processor; and
computer executable program code configured to execute on the processor, wherein the computer executable program code is configured to:
receive a plurality of readback signal samples from the data storage element;
determine a sin term for each readback signal sample;
determine a cos term for each readback signal sample;
organize the readback signal samples according to the corresponding sin terms and cos terms; and
compute an input phase based on the organized readback signal samples.

15. The data storage system of claim 14, wherein organizing the readback signal samples comprises:
defining a first coordinate system, a first axis of the first coordinate system corresponding to sin function and a second axis of the first coordinate system corresponding to a cos function; and
placing each readback signal sample in the first coordinate system.

16. The data storage system of claim 15, wherein the computer executable program code is further configured to:
maintain a region counter corresponding to each of a plurality of regions in the first coordinate system;
increment a corresponding region counter each time a readback signal sample is organized into the corresponding region; and
identify when one of the plurality of regions includes a threshold number of readback signal samples.

17. The data storage system of claim 15, wherein organizing the readback signal samples further comprises:

defining a second coordinate system, a first axis of the second coordinate system corresponding to sin function and a second axis of the second coordinate system corresponding to a cos function, the second coordinate system being offset from the first coordinate system by a predetermined angle; and placing each readback signal sample in the second coordinate system.

18. The data storage system of claim 17, wherein the computer executable program code is further configured to:

maintain a region counter corresponding to each of a plurality of regions in the second coordinate system;

increment a corresponding region counter each time a readback signal sample is organized into the corresponding region; and identify when one of the plurality of regions includes a threshold number of readback signal samples.

19. The data storage system of claim 17, wherein each readback signal sample comprises a 4T signal and each of the first coordinate system and second coordinate system comprises four quadrants.

20. The data storage system of claim 14, wherein the computer executable program code is further configured to:

define an amplitude threshold; and exclude any readback signal samples that fall below the amplitude threshold from the computation of input phase.

* * * * *